(12) United States Patent
Shabtay et al.

(10) Patent No.: US 12,710,665 B2
(45) Date of Patent: Aug. 18, 2026

(54) THIN DUAL-APERTURE ZOOM DIGITAL CAMERA

(71) Applicant: Corephotonics Ltd., Tel Aviv (IL)

(72) Inventors: Gal Shabtay, Tel Aviv (IL); Ephraim Goldenberg, Tel Aviv (IL)

(73) Assignee: Corephotonics Ltd., Tel Aviv (IL)

( * ) Notice: Subject to any disclaimer, the term of this patent is extended or adjusted under 35 U.S.C. 154(b) by 0 days.

(21) Appl. No.: 19/452,955

(22) Filed: Jan. 20, 2026

(65) Prior Publication Data

US 2026/0140390 A1 May 21, 2026

Related U.S. Application Data

(63) Continuation of application No. 19/063,375, filed on Feb. 26, 2025, now Pat. No. 12,554,146, which is a (Continued)

(51) Int. Cl.
*H04N 23/69* (2023.01)
*G02B 1/04* (2006.01)

(Continued)

(52) U.S. Cl.
CPC ........... *G02B 27/646* (2013.01); *G02B 1/041* (2013.01); *G02B 9/60* (2013.01); *G02B 13/0045* (2013.01); *G02B 13/009* (2013.01); *G02B 13/02* (2013.01); *G02B 27/0025* (2013.01); *H04N 23/16* (2023.01); *H04N 23/45* (2023.01);

(Continued)

(58) Field of Classification Search
CPC ........ G02B 27/646; G02B 1/041; G02B 9/60; G02B 13/0045; G02B 13/009; G02B 13/02; G02B 27/0025; G02B 5/005; G02B 9/00; G02B 9/12; G02B 9/62; G02B 9/64; G02B 13/00; G02B 13/002; G02B 13/004; G02B 13/18; H04N 23/69; H04N 23/16;

(Continued)

(56) References Cited

U.S. PATENT DOCUMENTS

2018/0275374 A1* 9/2018 Dror ...................... G02B 1/041

* cited by examiner

*Primary Examiner* — Lin Ye
*Assistant Examiner* — Fayez A Bhuiyan
(74) *Attorney, Agent, or Firm* — Nathan & Associates Patent Agents Ltd.; Menachem Nathan

(57) ABSTRACT

A dual-aperture zoom camera comprising a Wide camera with a respective Wide lens and a Tele camera with a respective Tele lens, the Wide and Tele cameras mounted directly on a single printed circuit board, wherein the Wide and Tele lenses have respective effective focal lengths $EFL_W$ and $EFL_T$ and respective total track lengths $TTL_W$ and $TTL_T$ and wherein $TTL_W/EFL_W>1.1$ and $TTL_T/EFL_T<1.0$. Optionally, the dual-aperture zoom camera may further comprise an optical OIS controller configured to provide a compensation lens movement according to a user-defined zoom factor (ZF) and a camera tilt (CT) through $LMV=CT*EFL_{ZF}$, where $EFL_{ZF}$ is a zoom-factor dependent effective focal length.

20 Claims, 9 Drawing Sheets

Related U.S. Application Data continuation of application No. 18/927,879, filed on Oct. 26, 2024, now Pat. No. 12,265,234, which is a continuation of application No. 18/507,055, filed on Nov. 12, 2023, now Pat. No. 12,164,115, which is a continuation of application No. 18/180,304, filed on Mar. 8, 2023, now Pat. No. 11,852,845, which is a continuation of application No. 17/665,498, filed on Feb. 5, 2022, now Pat. No. 11,614,635, which is a continuation of application No. 16/812,289, filed on Mar. 7, 2020, now Pat. No. 11,287,668, which is a continuation of application No. 16/299,450, filed on Mar. 12, 2019, now Pat. No. 10,620,450, which is a continuation of application No. 15/456,506, filed on Mar. 11, 2017, now Pat. No. 10,288,896, which is a continuation of application No. 14/973,753, filed on Dec. 18, 2015, now Pat. No. 9,599,796, which is a continuation of application No. 14/373,500, filed as application No. PCT/IB2014/062854 on Jul. 4, 2014, now Pat. No. 9,413,972.

(60) Provisional application No. 61/842,987, filed on Jul. 4, 2013.

(51) Int. Cl.

*G02B 9/60* (2006.01)
*G02B 13/00* (2006.01)
*G02B 13/02* (2006.01)
*G02B 27/00* (2006.01)
*G02B 27/64* (2006.01)
*H04N 23/16* (2023.01)
*H04N 23/45* (2023.01)
*H04N 23/57* (2023.01)
*G02B 5/00* (2006.01)
*G02B 9/00* (2006.01)
*G02B 9/12* (2006.01)
*G02B 9/62* (2006.01)
*G02B 9/64* (2006.01)
*G02B 13/18* (2006.01)
*H04N 101/00* (2006.01)

(52) U.S. Cl.

CPC ............. *H04N 23/57* (2023.01); *H04N 23/69* (2023.01); *G02B 5/005* (2013.01); *G02B 9/00* (2013.01); *G02B 9/12* (2013.01); *G02B 9/62* (2013.01); *G02B 9/64* (2013.01); *G02B 13/00* (2013.01); *G02B 13/002* (2013.01); *G02B 13/004* (2013.01); *G02B 13/18* (2013.01); *H04N 2101/00* (2013.01); *H04N 2201/00* (2013.01); *Y10T 29/4913* (2015.01)

(58) Field of Classification Search

CPC .... H04N 23/57; H04N 23/45; H04N 2101/00; H04N 2201/00; Y10T 29/4913

See application file for complete search history.

Polychromatic Diffraction Through Focus MTF
Angle 6/2/2013
Data for 0.4350 to 0.6560 μm.
Spatial Frequency: 180.0000 cycles/mm.

30/06/2013
Maximum distortion = 1.3%

Polychromatic Diffraction Through Focus MTF
Angle 6/2/2013
Data for 0.4350 to 0.6560 µm.
Spatial Frequency: 180.0000 cycles/mm.

30/06/2013
Maximum distortion = 1.5%

Polychromatic Diffraction Through Focus MTF
Angle 6/9/2013
Data for 0.4350 to 0.6560 µm.
Spatial Frequency: 180.0000 cycles/mm.

30/06/2013
Maximum distortion = 1.3%

THIN DUAL-APERTURE ZOOM DIGITAL CAMERA

CROSS REFERENCE TO RELATED APPLICATIONS

This application is a continuation of U.S. patent application Ser. No. 19/063,375 filed Feb. 26, 2025 (now allowed), which was a continuation of U.S. patent application Ser. No. 18/927,879 filed Oct. 26, 2024 (now U.S. Pat. No. 12,265,234), which was a continuation of U.S. patent application Ser. No. 18/507,055 filed Nov. 12, 2023 (now U.S. Pat. No. 12,164,115), which was a continuation of U.S. patent application Ser. No. 18/180,304 filed Mar. 8, 2023 (now U.S. Pat. No. 11,852,845), which was a continuation of U.S. patent application Ser. No. 17/665,498 filed Feb. 5, 2022 (now U.S. Pat. No. 11,614,635), which was a continuation of U.S. patent application Ser. No. 16/812,289 filed Mar. 7, 2020, now U.S. Pat. No. 11,287,668, which was a continuation of U.S. patent application Ser. No. 16/299,450 filed Mar. 12, 2019, now U.S. Pat. No. 10,620,450, which was a continuation of U.S. patent application Ser. No. 15/456,506 filed Mar. 11, 2017, now U.S. Pat. No. 10,288,896, which was a continuation of U.S. patent application Ser. No. 14/973,753 filed Dec. 18, 2015 (now U.S. Pat. No. 9,599,796), which was a continuation of U.S. patent application Ser. No. 14/373,500 filed Jul. 21, 2014 (now U.S. Pat. No. 9,413,972), which was a 371 application from international application PCT/IB2014/062854 filed Jul. 4, 2014, and is related to and claims priority from U.S. Provisional Patent Application No. 61/842,987 filed Jul. 4, 2013, which is incorporated herein by reference in its entirety.

FIELD

Embodiments disclosed herein relate in general to digital cameras, and more particularly, to thin dual-aperture zoom digital cameras that can be incorporated in a portable electronic product such as a mobile phone.

BACKGROUND

Compact multi-aperture and in particular dual-aperture (also referred to as "dual-lens" or "dual-camera") digital cameras are known. Miniaturization technologies allow incorporation of such cameras in compact portable electronic devices such as tablets and mobile phones (the latter referred to hereinafter generically as "smartphones"), where they provide advanced imaging capabilities such as zoom, see e.g. co-owned PCT patent application No. PCT/IB2013/060356 titled "High-resolution thin multi-aperture imaging systems", which is incorporated herein by reference in its entirety. A two-camera system (exemplarily including a wide-angle (or "Wide") camera and a telephoto (or "Tele") camera) is calibrated in an end product (e.g. in a smartphone) after manufacturing.

System calibration matches Tele and Wide image pixels by capturing in both cameras known objects. This enables faster and more reliable application of fusion between the two cameras, as described in PCT/IB2013/060356. One problem with such cameras may arise from mishaps such as drop impact. The latter may cause a relative movement between the two cameras after system calibration, changing the pixel matching between Tele and Wide images and thus preventing fast reliable fusion of the Tele and Wide images.

Another problem with dual-aperture zoom cameras relates to their height. There is a large difference in the height (also known as total track length or "TTL") of the Tele and Wide cameras. The TTL, see FIG. 1, is defined as the maximal distance between the object-side surface of a first lens element and a camera image sensor plane. In the following, "W" and "T" subscripts refer respectively to Wide and Tele cameras. In most miniature lenses, the TTL is larger than the lens effective focal length (EFL), which has a meaning well known in the art, see FIG. 1. A typical TTL/EFL ratio for a given lens (or lens assembly) is around 1.3. In a single-aperture smartphone camera, EFL is typically 3.5 mm, leading to a field of view of 70-80°. Assuming one wishes to achieve a dual-aperture X2 optical zoom in a smartphone, it would be natural to use $EFL_W$=3.5 mm and $EFL_T$=2×$EFL_W$=7 mm. However, without spatial restrictions, the Wide lens will have an $EFL_W$=3.5 mm and a $TTL_W$ of 3.5×1.3=4.55 mm, while the Tele lens will have $EFL_T$=7 mm and $TTL_T$ of 7×1.3=9.1 mm. The incorporation of a 9.1 mm lens in a smartphone camera would lead to a camera height of around 9.8 mm, which is unacceptable for many smartphone makers. Also the large height difference (approx. 4.55 mm) between the Wide and Tele cameras can cause shadowing and light-blocking problems, see FIG. 2.

A third problem relates to the implementation of standard optical image stabilization (OIS) in a dual-aperture zoom camera. Standard OIS compensates for camera tilt ("CT") by a parallel-to-the image sensor (exemplarily in the X-Y plane) lens movement ("LMV"). Camera tilt causes image blur. The amount of LMV (in mm) needed to counter a given camera tilt depends on the cameras lens EFL, according to the relation LMV=CT*EFL where "CT" is in radians and EFL is in mm. Since as shown above a dual-aperture zoom camera may include two lenses with significantly different EFLs, it is impossible to move both lenses together and achieve optimal tilt compensation for both Tele and Wide cameras. That is, since the tilt is the same for both cameras, a movement that will cancel the tilt for the Wide camera will be insufficient to cancel the tilt for the Tele camera. Similarly, a movement that will cancel the tilt for the Tele camera will over-compensate the tilt cancellation for the Wide camera. Assigning a separate OIS actuator to each camera can achieve simultaneous tilt compensation, but at the expense of a complicated and expensive camera system.

SUMMARY

Embodiments disclosed herein refer to thin dual-aperture zoom cameras with improved drop impact resistance, smaller total thickness, smaller TTL difference between Wide and Tele cameras and improved OIS compensation.

In some embodiments there are provided dual-aperture zoom cameras comprising a Wide camera with a respective Wide lens and a Tele camera with a respective Tele lens, the Wide and Tele cameras mounted directly on a single printed circuit board, wherein the Wide and Tele lenses have respective effective focal lengths $EFL_W$ and $EFL_T$ and respective total track lengths $TTL_W$ and $TTL_T$ and wherein $TTL_W/EFL_W>1.1$ and $TTL_T/EFL_T<1.0$.

In some embodiments, a dual-aperture zoom camera disclosed herein further comprises an OIS controller configured to provide a compensation lens movement according to a camera tilt input and a user-defined zoom factor through LMV=CT*$EFL_{ZF}$, wherein $EFL_{ZF}$ is a "zoom-factor dependent EFL".

In some embodiments, the Tele lens is a lens as described in detail in U.S. provisional patent application No. 61/842,987 and in U.S. patent application Ser. No. 14/367,924, titled "Miniature telephoto lens assembly", both of which are incorporated herein by reference in their entirety.

In some embodiments there are provided methods for manufacturing a dual-aperture zoom camera comprising the steps of providing a Wide camera having a Wide lens with an effective focal length $EFL_W$ and a total track length $TTL_W$, providing a Tele camera having a Tele lens with an effective focal length $EFL_T$ and a total track length $TTL_T$, wherein $TTL_W/EFL_W>1.1$ and wherein $TTL_T/EFL_T<1.0$, and mounting the Wide and Tele cameras directly on a single printed circuit board.

In some embodiments, the methods further comprise the step of configuring an OIS controller of the dual-aperture zoom camera to compensate lens movement of the Wide and Tele lenses according to a camera tilt input and a user-defined zoom factor.

BRIEF DESCRIPTION OF THE DRAWINGS

Non-limiting embodiments are herein described, by way of example only, with reference to the accompanying drawings, wherein.

DETAILED DESCRIPTION

Figure 1:
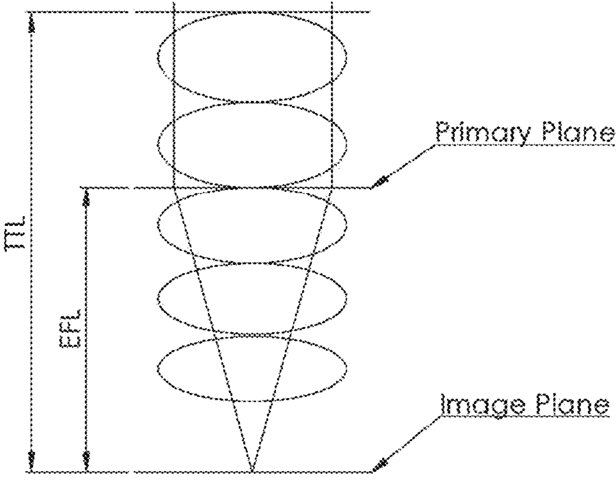
FIG. 1 shows definitions of TTL and EFL.
Figure 2:
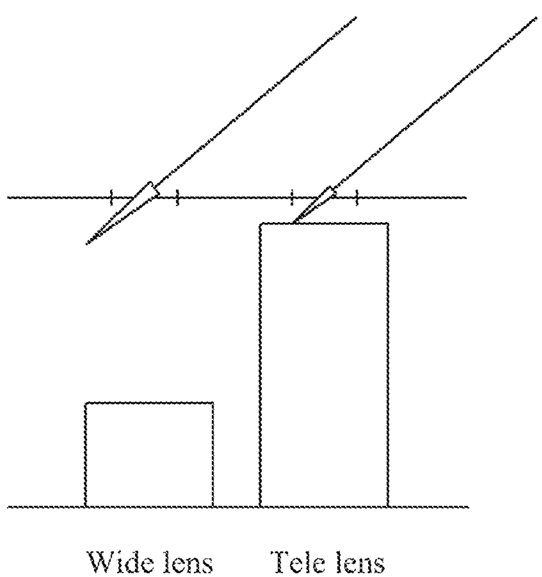
FIG. 2 shows shadowing and light-blocking problems caused by height differences between Wide and Tele cameras in a dual-aperture camera.
Figure 3:
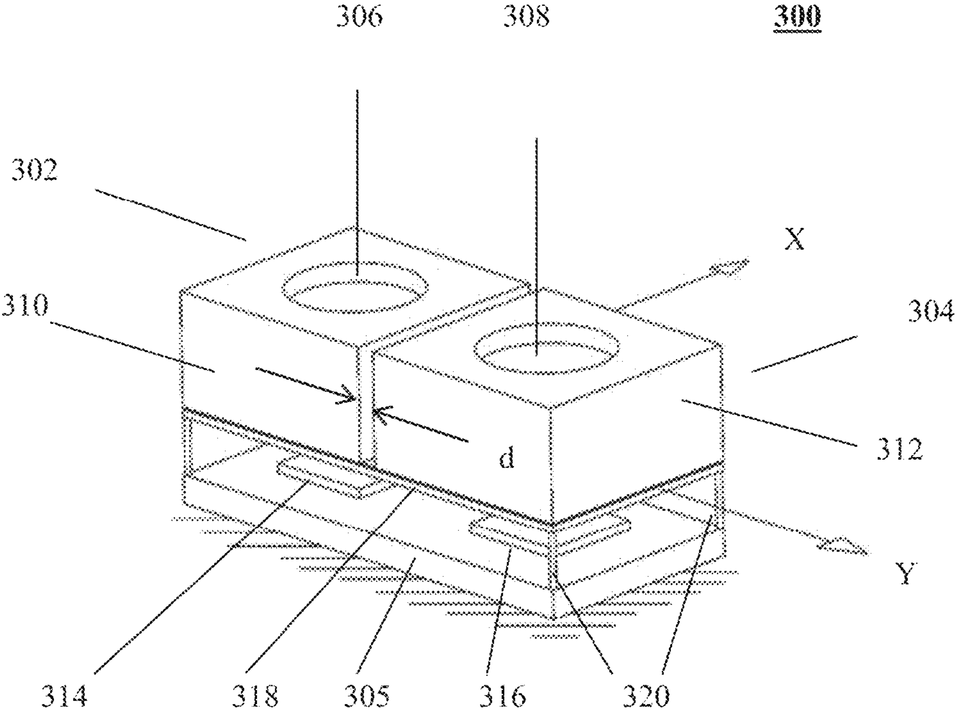
FIG. 3 shows an embodiment of a dual-aperture camera disclosed herein.
Figure 4:
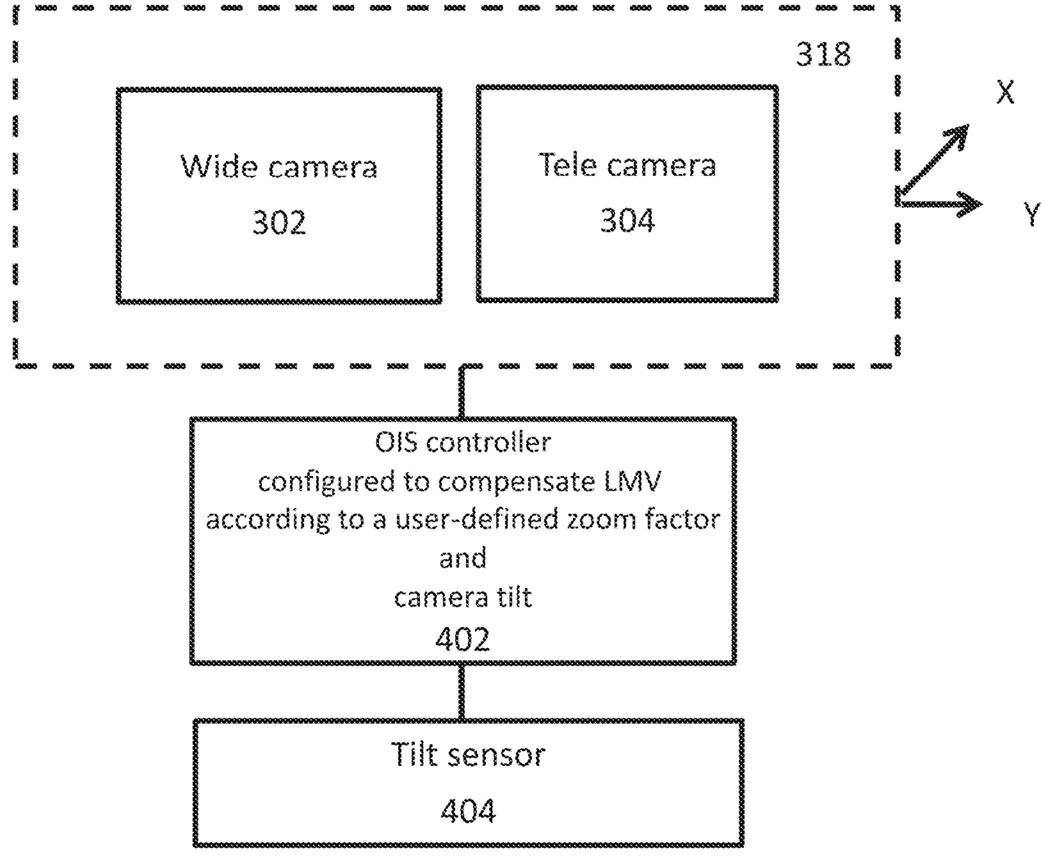
FIG. 4 shows schematically in a block diagram details of the camera embodiment of FIG. 3.

The present inventors have determined that camera movement (due to exemplarily, but not limited to mishaps such as drop impact) can be avoided or minimized by mounting the two cameras directly on a single printed circuit board and by minimizing a distance "d" therebetween. FIG. 3 shows an embodiment of a dual-aperture camera 300 that includes two cameras 302 and 304 mounted directly on a single printed circuit board 305. Each camera includes a lens assembly (respectively 306 and 308), an actuator (respectively 310 and 312) and an image sensor (respectively 314 and 316). The two actuators are rigidly mounted on a rigid base 318 that is flexibly connected to the printed board through flexible elements 320. Base 318 is movable by an OIS mechanism (not shown) controlled by an OIS controller 402 (FIG. 4). The OIS controller is coupled to, and receives camera tilt information from, a tilt sensor (exemplarily a gyroscope) 404 (FIG. 4). More details of an exemplary OIS procedure as disclosed herein are given below with reference to FIG. 4. The two cameras are separated by a small distance "d", typically 1 mm. This small distance between cameras also reduces the perspective effect, enabling smoother zoom transition between cameras.

In some embodiments and optionally, a magnetic shield plate as described in co-owned U.S. patent application Ser. No. 14/365,718 titled "Magnetic shielding between voice coil motors in a dual-aperture camera", which is incorporated herein by reference in its entirety, may be inserted in the gap with width d between the Wide and Tele cameras.

In general, camera dimensions shown in FIG. 3 may be as follows: a length L of the camera (in the Y direction) may vary between 13-25 mm, a width W of the camera (in the X direction) may vary between 6-12 mm, and a height H of the camera (in the Z direction, perpendicular to the X-Y plane) may vary between 4-12 mm. More typically in a smartphone camera disclosed herein, L=18 mm, W=8.5 mm and H=7 mm.

The present inventors have further determined that in some embodiments, the problem posed by the large difference in the TTL/EFL ratio of known dual-aperture camera Tele and Wide lenses may be solved through use of a standard lens for the Wide camera ($TTL_W/EFL_W>1.1$, typically 1.3) and of a special Tele lens design for the Tele camera ($TTL_T/EFL_T<1$, typically 0.87). Exemplarily, the special Tele lens design may be as described in co-owned U.S. patent application Ser. No. 14/367,924, titled "Miniature telephoto lens assembly", which is incorporated herein by reference in its entirety. A Tele lens assembly described in detail below comprises five lenses that include, in order from an object side to an image side: a first lens element with positive refractive power having a convex object-side surface, a second lens element with negative refractive power having a thickness $d_2$ on an optical axis and separated from the first lens element by a first air gap, a third lens element with negative refractive power and separated from the second lens element by a second air gap, a fourth lens element having a positive refractive power and separated from the third lens element by a third air gap, and a fifth lens element having a negative refractive power, separated from the fourth lens element by a fourth air gap, the fifth lens element having a thickness $d_5$ on the optical axis. The shape (convex or concave) of a lens element surface is defined as viewed from the respective side (i.e. from an object side or from an image side). The lens assembly May exemplarily have a F number (F #)<3.2. In an embodiment, the focal length of the first lens element f1 is smaller than $TTL_T/2$, the first, third and fifth lens elements have each an Abbe number greater than 50, the second and fourth lens elements have each an Abbe number smaller than 30, the first air gap is smaller than $d_2/2$, the third air gap is greater than $TTL_T/5$ and the fourth air gap is smaller than $1.5d_5$. In some embodiments, the surfaces of the lens elements may be aspheric.

Figure 5A:
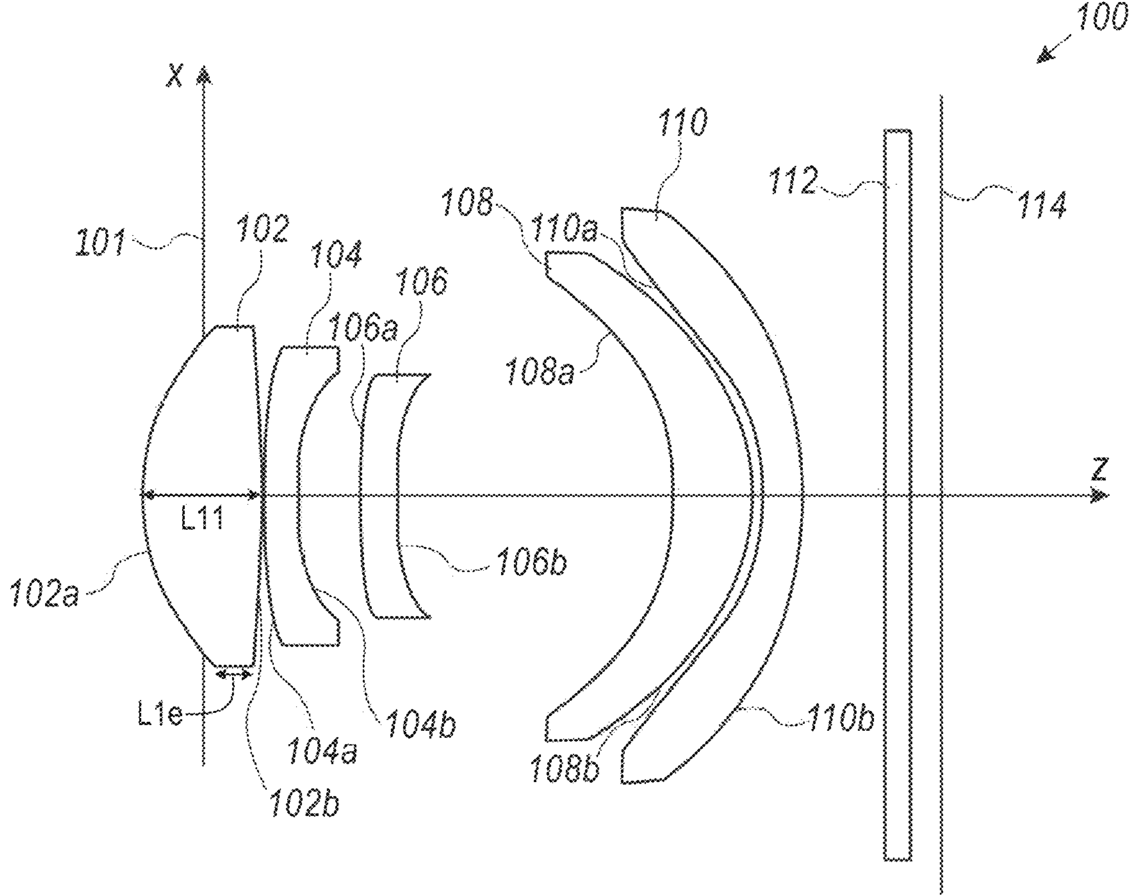
FIG. 5A shows a first embodiment of an optical lens system disclosed herein.
Figure 5B:
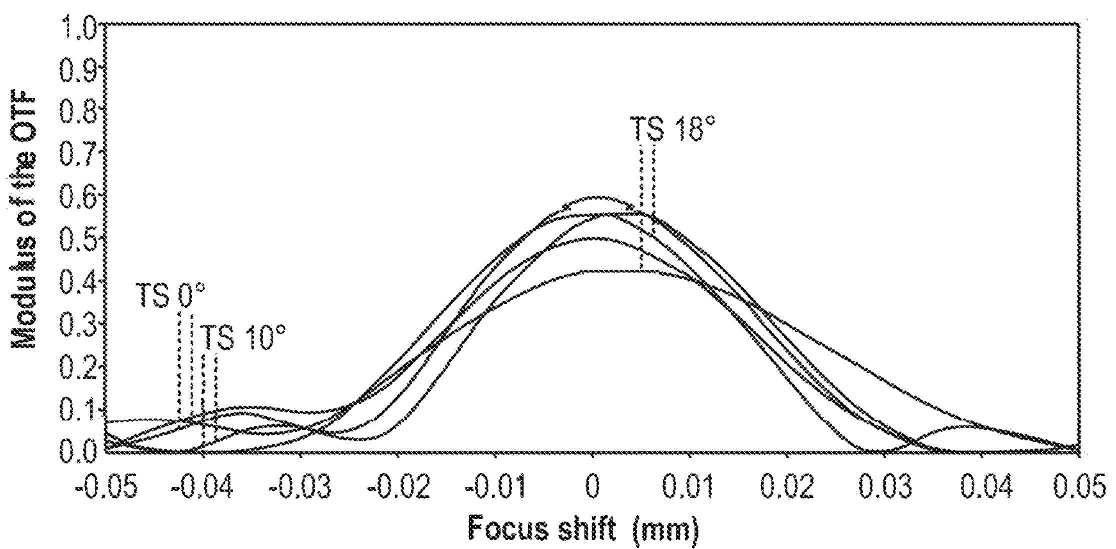
FIG. 5B shows the modulus of the optical transfer function (MTF) vs. focus shift of the entire optical system for various fields in the first embodiment.
Figure 5C:
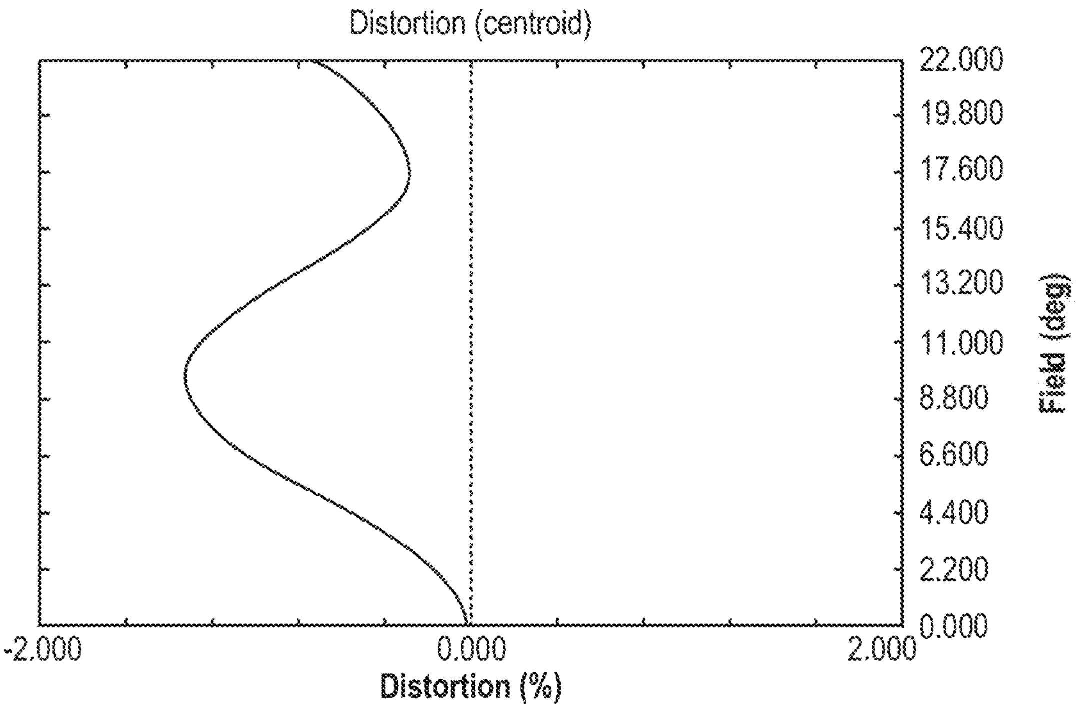
FIG. 5C shows the distortion vs. field angle (+Y direction) in percent in the first embodiment.

FIG. 5A shows a first embodiment of an optical lens system disclosed in incorporated by reference U.S. provisional patent application Ser. No. 14/367,924 and marked 100. FIG. 5B shows the MTF vs. focus shift of the entire optical system for various fields in embodiment 100. FIG. 5C shows the distortion +Y in percent vs. field. Embodiment 100 comprises in order from an object side to an image side: an optional stop 101; a first plastic lens element 102 with positive refractive power having a convex object-side surface 102*a* and a convex or concave image-side surface 102*b*;

a second plastic lens element 104 with negative refractive power and having a meniscus convex object-side surface 104*a*, with an image side surface marked 104*b*; a third plastic lens element 106 with negative refractive power having a concave object-side surface 106*a* with an inflection point and a concave image-side surface 106*b*; a fourth plastic lens element 108 with positive refractive power having a positive meniscus, with a concave object-side surface marked 108*a* and an image-side surface marked 108*b*; and a fifth plastic lens element 110 with negative refractive power having a negative meniscus, with a concave object-side surface marked 110*a* and an image-side surface marked 110*b*. The optical lens system further comprises an optional glass window 112 disposed between the image-side surface 110*b* of fifth lens element 110 and an image plane 114 for image formation of an object. Moreover, an electronic sensor is disposed at image plane 114 for the image formation.

In embodiment 100, all lens element surfaces are aspheric. Detailed optical data is given in Table 1, and the aspheric surface data is given in Table 2, wherein the units of the radius of curvature (R), lens element thickness and/or distances between elements along the optical axis and diameter are expressed in mm. "Nd" is the refraction index. The equation of the aspheric surface profiles is expressed by:

TABLE 1

| # | Comment | Radius R [mm] | Distances [mm] | Nd/Vd | Diameter [mm] |
|---|---|---|---|---|---|
| 1 | Stop | Infinite | −0.466 | | 2.4 |
| 2 | L11 | 1.5800 | 0.894 | 1.5345/57.095 | 2.5 |
| 3 | L12 | −11.2003 | 0.020 | | 2.4 |
| 4 | L21 | 33.8670 | 0.246 | 1.63549/23.91 | 2.2 |
| 5 | L22 | 3.2281 | 0.449 | | 1.9 |
| 6 | L31 | −12.2843 | 0.290 | 1.5345/57.095 | 1.9 |
| 7 | L32 | 7.7138 | 2.020 | | 1.8 |
| 8 | L41 | −2.3755 | 0.597 | 1.63549/23.91 | 3.3 |
| 9 | L42 | −1.8801 | 0.068 | | 3.6 |
| 10 | L51 | −1.8100 | 0.293 | 1.5345/57.095 | 3.9 |
| 11 | L52 | −5.2768 | 0.617 | | 4.3 |
| 12 | Window | Infinite | 0.210 | 1.5168/64.17 | 3.0 |
| 13 | | Infinite | 0.200 | | 3.0 |

TABLE 2

| # | Conic coefficient k | $\alpha_2$ | $\alpha_3$ | $\alpha_4$ | $\alpha_5$ | $\alpha_6$ |
|---|---|---|---|---|---|---|
| 2 | −0.4668 | 7.9218E−03 | 2.3146E−02 | −3.3436E−02 | 2.3650E−02 | −9.2437E−03 |
| 3 | −9.8525 | 2.0102E−02 | 2.0647E−04 | 7.4394E−03 | −1.7529E−02 | 4.5206E−03 |
| 4 | 10.7569 | −1.9248E−03 | 8.6003E−02 | 1.1676E−02 | −4.0607E−02 | 1.3545E−02 |
| 5 | 1.4395 | 5.1029E−03 | 2.4578E−01 | −1.7734E−01 | 2.9848E−01 | −1.3320E−01 |
| 6 | 0.0000 | 2.1629E−01 | 4.0134E−02 | 1.3615E−02 | 2.5914E−03 | −1.2292E−02 |
| 7 | −9.8953 | 2.3297E−01 | 8.2917E−02 | −1.2725E−01 | 1.5691E−01 | −5.9624E−02 |
| 8 | 0.9938 | −1.3522E−02 | −7.0395E−03 | 1.4569E−02 | −1.5336E−02 | 4.3707E−03 |
| 9 | −6.8097 | −1.0654E−01 | 1.2933E−02 | 2.9548E−04 | −1.8317E−03 | 5.0111E−04 |
| 10 | −7.3161 | −1.8636E−01 | 8.3105E−02 | −1.8632E−02 | 2.4012E−03 | −1.2816E−04 |
| 11 | 0.0000 | −1.1927E−01 | 7.0245E−02 | −2.0735E−02 | 2.6418E−03 | −1.1576E−04 |

$$z = \frac{cr^2}{1+\sqrt{1-(1+k)c^2r^2}} + \alpha_1 r^2 + \alpha_2 r^4 + \alpha_3 r^6 + \alpha_4 r^8 + \alpha_5 r^{10} + \alpha_6 r^{12} + \alpha_7 r^{14}$$

where r is distance from (and perpendicular to) the optical axis, k is the conic coefficient, c=1/R where R is the radius of curvature, and a are coefficients given in Table 2. In the equation above as applied to embodiments of a lens assembly disclosed in co-owned U.S. patent application Ser. No. 14/367,924, coefficients $\alpha_1$ and $\alpha_7$ are zero. Note that the maximum value of r "max r"=Diameter/2. Also note that Table 1 (and in Tables 3 and 5 below), the distances between various elements (and/or surfaces) are marked "Lmn" (where m refers to the lens element number, n=1 refers to the element thickness and n=2 refers to the air gap to the next element) and are measured on the optical axis z, wherein the stop is at z=0. Each number is measured from the previous surface. Thus, the first distance-0.466 mm is measured from the stop to surface 102*a*, the distance L11 from surface 102*a* to surface 102*b* (i.e. the thickness of first lens element 102) is 0.894 mm, the gap L12 between surfaces 102*b* and 104*a* is 0.020 mm, the distance L21 between surfaces 104*a* and 104*b* (i.e. thickness $d_2$ of second lens element 104) is 0.246 mm, etc. Also, L21=$d_2$ and L51=$d_5$.

Embodiment 100 provides a field of view (FOV) of 44 degrees, with EFL=6.90 mm, F #=2.80 and TTL of 5.904 mm. Thus and advantageously, the ratio TTL/EFL=0.855. Advantageously, the Abbe number of the first, third and fifth lens element is 57.095. Advantageously, the first air gap between lens elements 102 and 104 (the gap between surfaces 102*b* and 104*a*) has a thickness (0.020 mm) which is less than a tenth of thickness $d_2$ (0.246 mm). Advantageously, the Abbe number of the second and fourth lens elements is 23.91. Advantageously, the third air gap between lens elements 106 and 108 has a thickness (2.020 mm) greater than TTL/5 (5.904/5 mm). Advantageously, the fourth air gap between lens elements 108 and 110 has a thickness (0.068 mm) which is smaller than $d_5/2$ (0.293/2 mm).

The focal length (in mm) of each lens element in embodiment 100 is as follows: f1=2.645, f2=−5.578, f3=−8.784, f4=9.550 and f5=−5.290. The condition $1.2\times|f3|>|f2|>1.5\times f1$ is clearly satisfied, as 1.2×8.787>5.578>1.5×2.645. f1 also fulfills the condition f1<TTL/2, as 2.645<2.952.

Figure 6A:
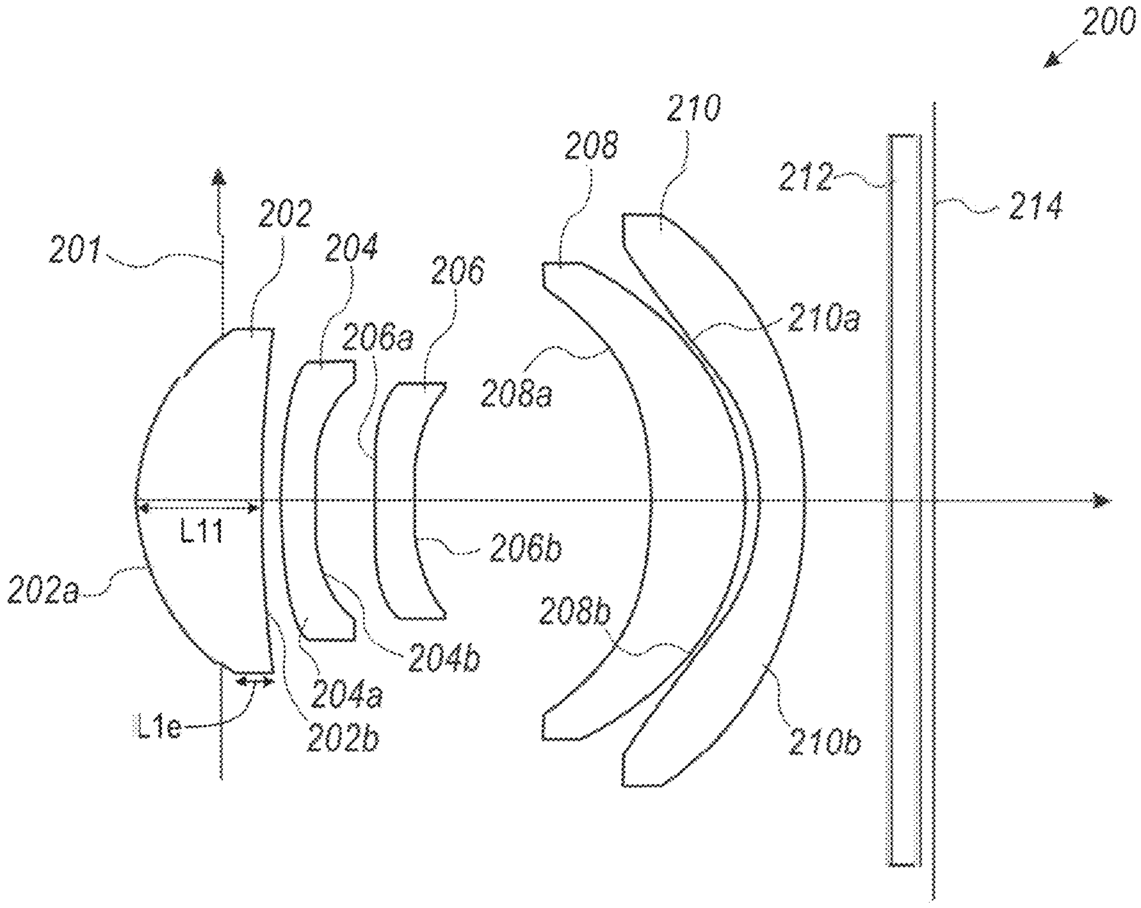
FIG. 6A shows a second embodiment of an optical lens system disclosed herein.
Figure 6B:
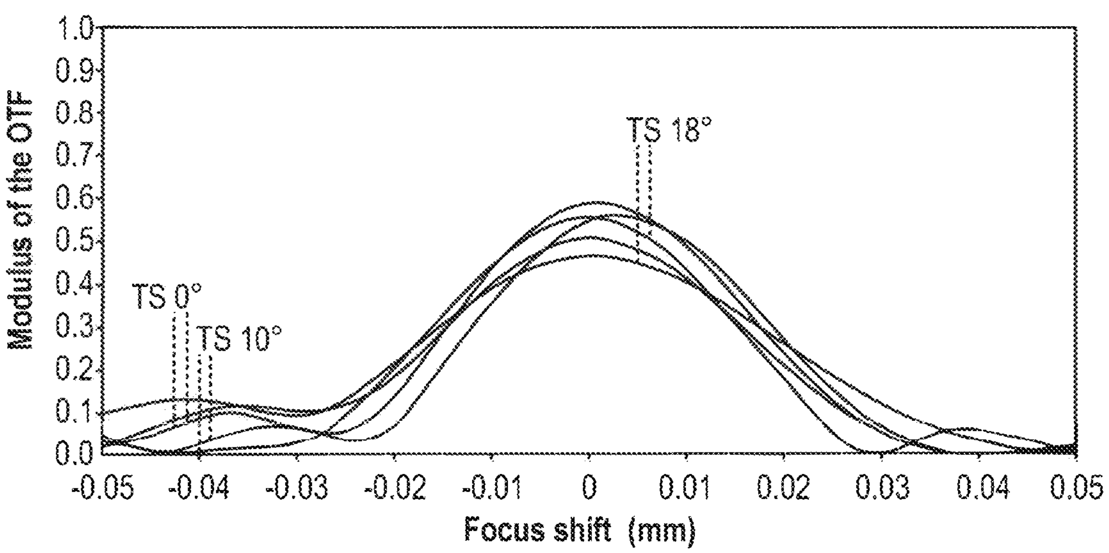
FIG. 6B shows the MTF vs. focus shift of the entire optical system for various fields in the second embodiment.
Figure 6C:
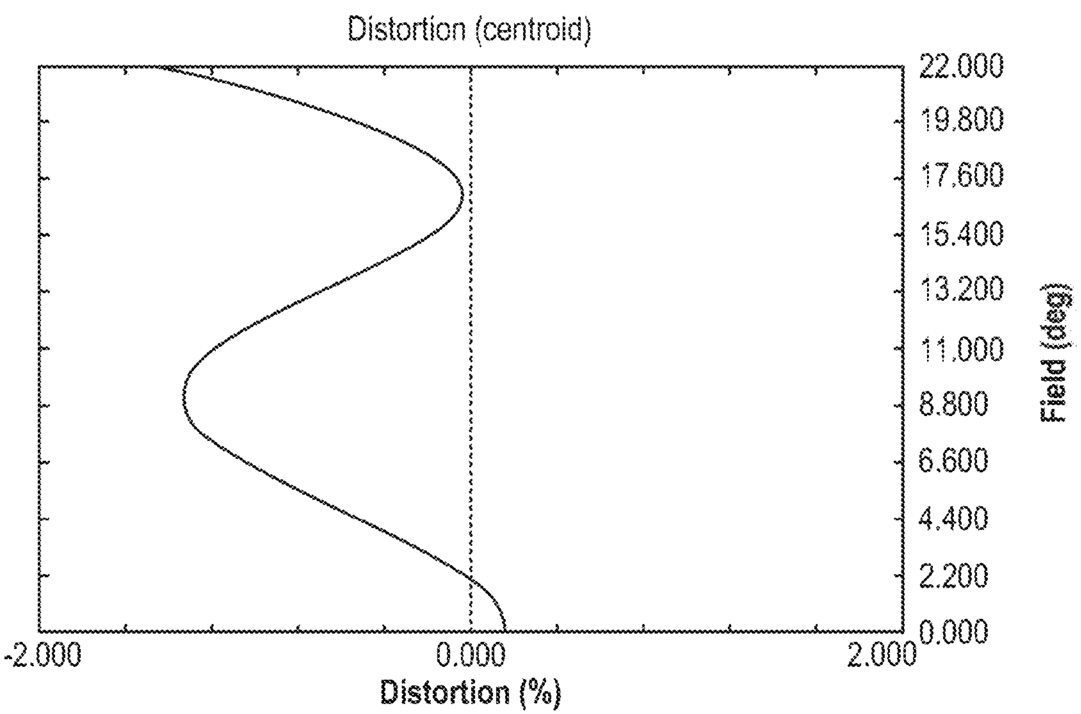
FIG. 6C shows the distortion +Y in percent in the second embodiment.

FIG. 6A shows a second embodiment of an optical lens system disclosed in incorporated by reference U.S. provisional patent application Ser. No. 14/367,924 and marked 200. FIG. 6B shows the MTF vs. focus shift of the entire optical system for various fields in embodiment 200. FIG. 6C shows the distortion +Y in percent vs. field. Embodiment

200 comprises in order from an object side to an image side: an optional stop 201; a first plastic lens element 202 with positive refractive power having a convex object-side surface **202*a* and a convex or concave image-side surface 202*b*; a second glass lens element 204 with negative refractive power, having a meniscus convex object-side surface 204*a*, with an image side surface marked 204*b*; a third plastic lens element 206 with negative refractive power having a concave object-side surface 206*a* with an inflection point and a concave image-side surface 206*b*; a fourth plastic lens element 208 with positive refractive power having a positive meniscus, with a concave object-side surface marked 208*a* and an image-side surface marked 208*b*; and a fifth plastic lens element 210 with negative refractive power having a negative meniscus, with a concave object-side surface marked 110*a* and an image-side surface marked 210*b*. The optical lens system further comprises an optional glass window 212 disposed between the image-side surface 210*b* of fifth lens element 210 and an image plane 214 for image formation of an object. Moreover, an electronic sensor is disposed at image plane 214** for the image formation.

In embodiment 200, all lens element surfaces are aspheric. Detailed optical data is given in Table 3, and the aspheric surface data is given in Table 4, wherein the markings and units are the same as in, respectively, Tables 1 and 2. The equation of the aspheric surface profiles is the same as for embodiment 100.

TABLE 3

| # | Comment | Radius R [mm] | Distances [mm] | Nd/Vd | Diameter [mm] |
|---|---|---|---|---|---|
| 1 | Stop | Infinite | −0.592 | | 2.5 |
| 2 | L11 | 1.5457 | 0.898 | 1.53463/56.18 | 2.6 |
| 3 | L12 | −127.7249 | 0.129 | | 2.6 |
| 4 | L21 | 6.6065 | 0.251 | 1.91266/20.65 | 2.1 |
| 5 | L22 | 2.8090 | 0.443 | | 1.8 |
| 6 | L31 | 9.6183 | 0.293 | 1.53463/56.18 | 1.8 |
| 7 | L32 | 3.4694 | 1.766 | | 1.7 |
| 8 | L41 | −2.6432 | 0.696 | 1.632445/23.35 | 3.2 |
| 9 | L42 | −1.8663 | 0.106 | | 3.6 |
| 10 | L51 | −1.4933 | 0.330 | 1.53463/56.18 | 3.9 |
| 11 | L52 | −4.1588 | 0.649 | | 4.3 |
| 12 | Window | Infinite | 0.210 | 1.5168/64.17 | 5.4 |
| 13 | | Infinite | 0.130 | | 5.5 |

TABLE 4

| # | Conic coefficient k | $\alpha_2$ | $\alpha_3$ | $\alpha_4$ | $\alpha_5$ | $\alpha_6$ |
|---|---|---|---|---|---|---|
| 2 | 0.0000 | −2.7367E−03 | 2.8779E−04 | −4.3661E−03 | 3.0069E−03 | −1.2282E−03 |
| 3 | −10.0119 | 4.0790E−02 | −1.8379E−02 | 2.2562E−02 | −1.7706E−02 | 4.9640E−03 |
| 4 | 10.0220 | 4.6151E−02 | 5.8320E−02 | −2.0919E−02 | −1.2846E−02 | 8.8283E−03 |
| 5 | 7.2902 | 3.6028E−02 | 1.1436E−01 | −1.9022E−02 | 4.7992E−03 | −3.4079E−03 |
| 6 | 0.0000 | 1.6639E−01 | 5.6754E−02 | −1.2238E−02 | −1.8648E−02 | 1.9292E−02 |
| 7 | 8.1261 | 1.5353E−01 | 8.1427E−02 | −1.5773E−01 | 1.5303E−01 | −4.6064E−02 |
| 8 | 0.0000 | −3.2628E−02 | 1.9535E−02 | −1.6716E−02 | −2.0132E−03 | 2.0112E−03 |
| 9 | 0.0000 | 1.5173E−02 | −1.2252E−02 | 3.3611E−03 | −2.5303E−03 | 8.4038E−04 |
| 10 | −4.7688 | −1.4736E−01 | 7.6335E−02 | −2.5539E−02 | 5.5897E−03 | −5.0290E−04 |
| 11 | 0.00E+00 | −8.3741E−02 | 4.2660E−02 | −8.4866E−03 | 1.2183E−04 | 7.2785E−05 |

Embodiment 200 provides a FOV of 43.48 degrees, with EFL=7 mm, F #=2.86 and TTL=5.90 mm. Thus and advantageously, the ratio TTL/EFL=0.843. Advantageously, the Abbe number of the first, third and fifth lens elements is 56.18. The first air gap between lens elements 202 and 204 has a thickness (0.129 mm) which is about half the thickness $d_2$ (0.251 mm). Advantageously, the Abbe number of the second lens element is 20.65 and of the fourth lens element is 23.35. Advantageously, the third air gap between lens elements 206 and 208 has a thickness (1.766 mm) greater than TTL/5 (5.904/5 mm). Advantageously, the fourth air gap between lens elements 208 and 210 has a thickness (0.106 mm) which is less than $d_5/2$ (0.330/2 mm).

The focal length (in mm) of each lens element in embodiment 200 is as follows: f1=2.851, f2=−5.468, f3=−10.279, f4=7.368 and f5=−4.536. The condition 1.2×|f3|>|f2|>1.5×f1 is clearly satisfied, as 1.2×10.279>5.468>1.5×2.851. f1 also fulfills the condition f1<TTL/2, as 2.851<2.950.

Figure 7A:
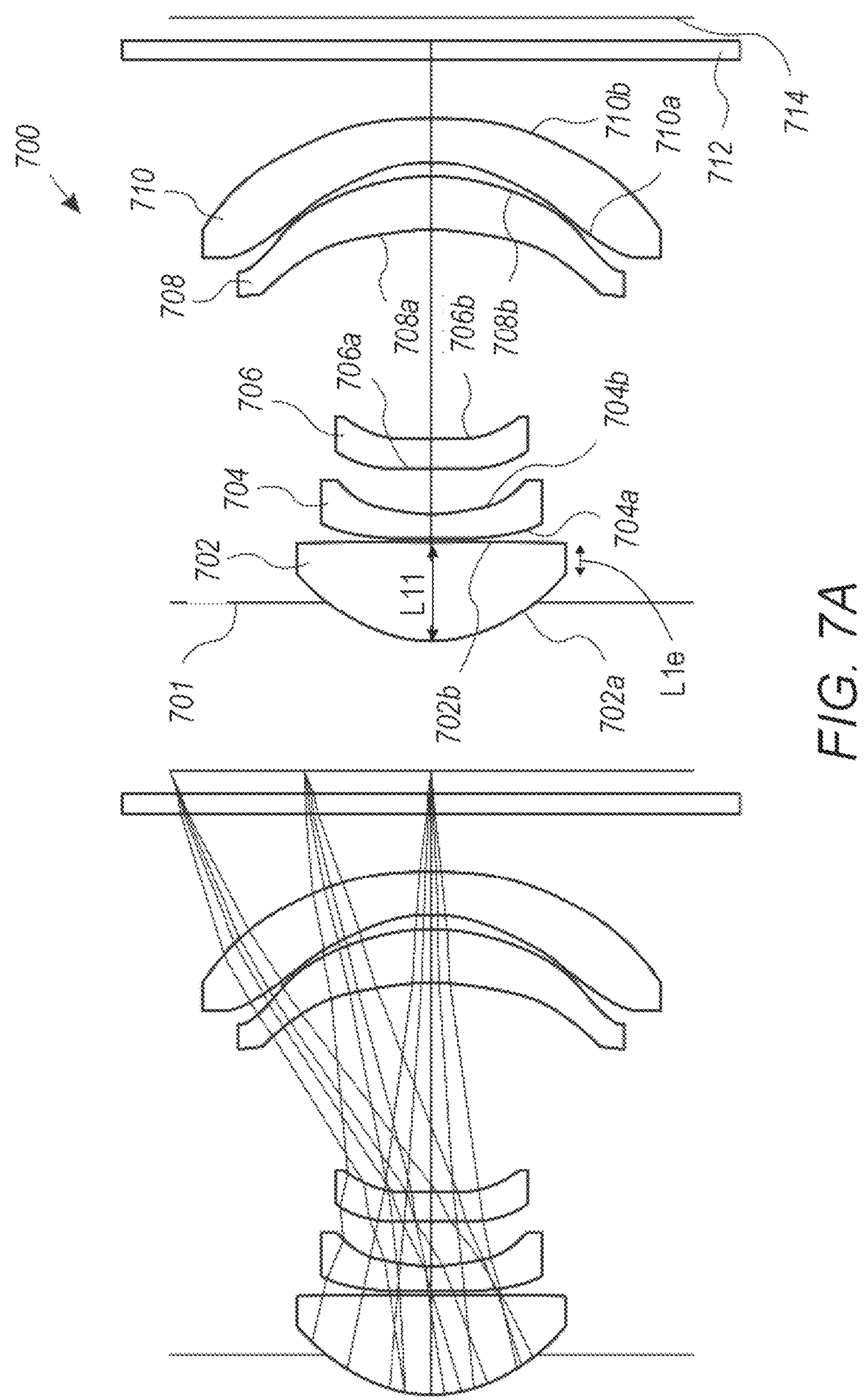
FIG. 7A shows a third embodiment of an optical lens system disclosed herein.
Figure 7B:
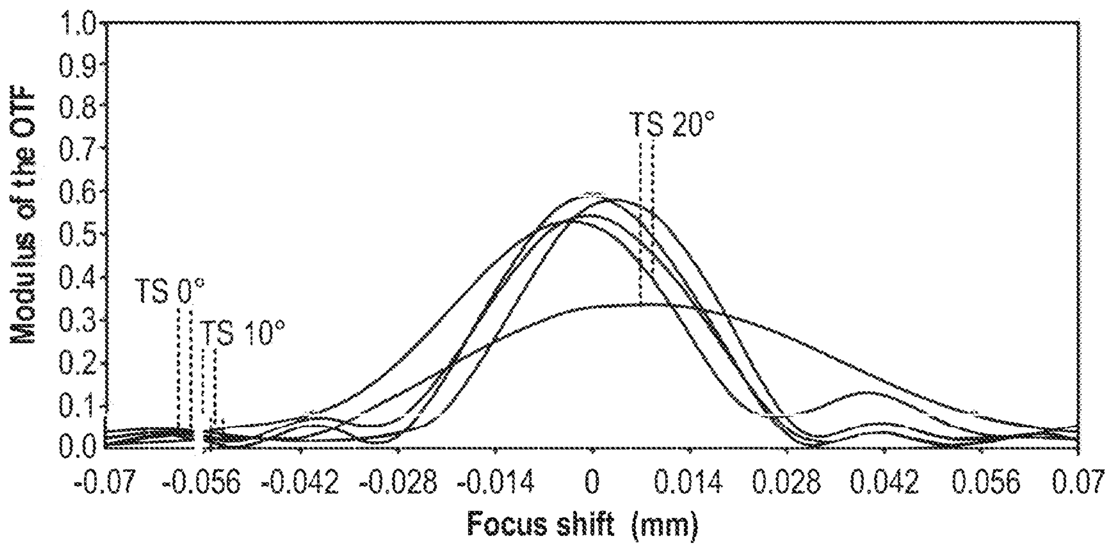
FIG. 7B shows the MTF vs. focus shift of the entire optical system for various fields in the third embodiment.
Figure 7C:
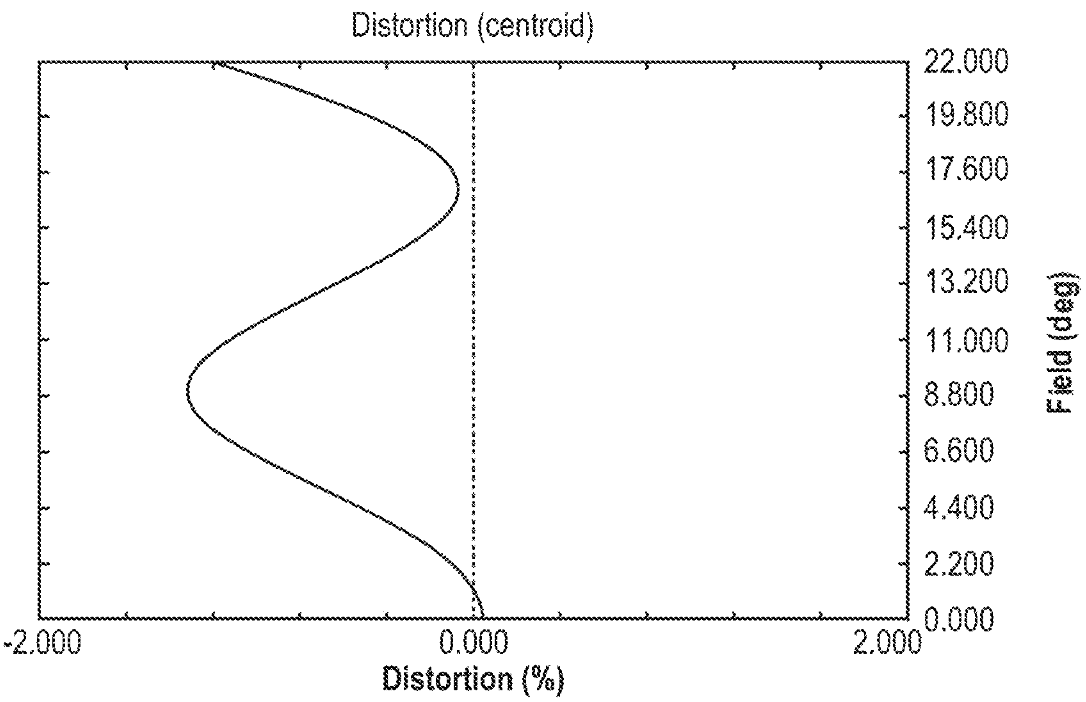
FIG. 7C shows the distortion +Y in percent in the third embodiment.

FIG. 7A shows a third embodiment of an optical lens system disclosed in incorporated by reference U.S. provisional patent application Ser. No. 14/367,924 and marked 700. FIG. 7B shows the MTF vs. focus shift of the entire optical system for various fields in embodiment 700. FIG. 7C shows the distortion +Y in percent vs. field. Embodiment 700 comprises in order from an object side to an image side: an optional stop 701; a first glass lens element 702 with positive refractive power having a convex object-side surface **702*a* and a convex or concave image-side surface 702*b*; a second plastic lens element 704 with negative refractive power, having a meniscus convex object-side surface 304*a*, with an image side surface marked 704*b*; a third plastic lens element 706 with negative refractive power having a concave object-side surface 706*a* with an inflection point and a concave image-side surface 706*b*; a fourth plastic lens element 708 with positive refractive power having a positive meniscus, with a concave object-side surface marked 708*a* and an image-side surface marked 708*b*; and a fifth plastic lens element 710 with negative refractive power having a negative meniscus, with a concave object-side surface marked 710*a* and an image-side surface marked 710*b*. The optical lens system further comprises an optional glass window 712 disposed between the image-side surface 710*b* of fifth lens element 710 and an image plane 714 for image formation of an object. Moreover, an electronic sensor is disposed at image plane 714** for the image formation.

In embodiment 700, all lens element surfaces are aspheric. Detailed optical data is given in Table 5, and the aspheric surface data is given in Table 6, wherein the markings and units are the same as in, respectively, Tables 1 and 2. The equation of the aspheric surface profiles is the same as for embodiments 100 and 200.

TABLE 5

| # | Comment | Radius R [mm] | Distances [mm] | Nd/Vd | Diameter [mm] |
|---|---|---|---|---|---|
| 1 | Stop | Infinite | −0.38 | | 2.4 |
| 2 | L11 | 1.5127 | 0.919 | 1.5148/63.1 | 2.5 |
| 3 | L12 | −13.3831 | 0.029 | | 2.3 |
| 4 | L21 | 8.4411 | 0.254 | 1.63549/23.91 | 2.1 |
| 5 | L22 | 2.6181 | 0.426 | | 1.8 |
| 6 | L31 | −17.9618 | 0.265 | 1.5345/57.09 | 1.8 |
| 7 | L32 | 4.5841 | 1.998 | | 1.7 |
| 8 | L41 | −2.8827 | 0.514 | 1.63549/23.91 | 3.4 |
| 9 | L42 | −1.9771 | 0.121 | | 3.7 |
| 10 | L51 | −1.8665 | 0.431 | 1.5345/57.09 | 4.0 |
| 11 | L52 | −6.3670 | 0.538 | | 4.4 |
| 12 | Window | Infinite | 0.210 | 1.5168/64.17 | 3.0 |
| 13 | | Infinite | 0.200 | | 3.0 |

TABLE 6

| # | Conic coefficient k | $\alpha_2$ | $\alpha_3$ | $\alpha_4$ | $\alpha_5$ | $\alpha_6$ |
|---|---|---|---|---|---|---|
| 2 | −0.534 | 1.3253E−02 | 2.3699E−02 | −2.8501E−02 | 1.7853E−02 | −4.0314E−03 |
| 3 | −13.473 | 3.0077E−02 | 4.7972E−03 | 1.4475E−02 | −1.8490E−02 | 4.3565E−03 |
| 4 | −10.132 | 7.0372E−04 | 1.1328E−01 | 1.2346E−03 | −4.2655E−02 | 8.8625E−03 |
| 5 | 5.180 | −1.9210E−03 | 2.3799E−01 | −8.8055E−02 | 2.1447E−01 | −1.2702E−01 |
| 6 | 0.000 | 2.6780E−01 | 1.8129E−02 | −1.7323E−02 | 3.7372E−02 | −2.1356E−02 |
| 7 | 10.037 | 2.7660E−01 | −1.0291E−02 | −6.0955E−02 | 7.5235E−02 | −1.6521E−02 |
| 8 | 1.703 | 2.6462E−02 | −1.2633E−02 | −4.7724E−04 | −3.2762E−03 | 1.6551E−03 |
| 9 | −1.456 | 5.7704E−03 | −1.8826E−02 | 5.1593E−03 | −2.9999E−03 | 8.0685E−04 |
| 10 | −6.511 | −2.1699E−01 | 1.3692E−01 | −4.2629E−02 | 6.8371E−03 | −4.1415E−04 |
| 11 | 0.000 | −1.5120E−01 | 8.6614E−02 | −2.3324E−02 | 2.7361E−03 | −1.1236E−04 |

Embodiment 700 provides a FOV of 44 degrees, EFL=6.84 mm, F #=2.80 and TTL=5.904 mm. Thus and advantageously, the ratio TTL/EFL=0.863. Advantageously, the Abbe number of the first lens element is 63.1, and of the third and fifth lens elements is 57.09. The first air gap between lens elements 702 and 704 has a thickness (0.029 mm) which is about 1/10th the thickness $d_2$ (0.254 mm). Advantageously, the Abbe number of the second and fourth lens elements is 23.91. Advantageously, the third air gap between lens elements 706 and 708 has a thickness (1.998 mm) greater than TTL/5 (5.904/5 mm). Advantageously, the fourth air gap between lens elements 708 and 710 has a thickness (0.121 mm) which is less than $d_5/2$ (0.431/2 mm).

The focal length (in mm) of each lens element in embodiment 700 is as follows: f1=2.687, f2=−6.016, f3=−6.777, f4=8.026 and f5=−5.090. The condition $1.2\times|f3|>|f2|>1.5\times f1$ is clearly satisfied, as 1.2×6.777>6.016>1.5×2.687. f1 also fulfills the condition f1<TTL/2, as 2.687<2.952.

Using a Tele lens designed as above, $TTL_T$ is reduced to 7×0.87=6.09 mm, leading to a camera height of less than 7 mm (acceptable in a smartphone). The height difference (vs. the Wide camera) is also reduced to approximately 1.65 mm, causing less shadowing and light blocking problems.

In some embodiments of a dual-aperture camera disclosed herein, the ratio "e"=5 $EFL_T/EFL_W$ is in the range 1.3-2.0. In some embodiments, the ratio $TTL_T/TTL_W<0.8e$. In some embodiments, $TTL_T/TTL_W$ is in the range 1.0-1.25. In general, in camera embodiments disclosed herein, $EFL_W$ may be in the range 2.5-6 mm and $EFL_T$ may be in the range 5-12 mm.

With reference now to FIG. 4, in operation, tilt sensor 404 dynamically measures the camera tilt (which is the same for both the Wide and Tele cameras). OIS controller 402, which is coupled to the actuators of both cameras through base 318, receives a CT input from the tilt sensor and a user-defined zoom factor, and controls the lens movement of the two cameras to compensate for the tilt. The LMV is exemplarily in the X-Y plane. The OIS controller is configured to provide a LMV equal to CT*$EFL_{ZF}$, where "$EFL_{ZF}$" is chosen according to the user-defined ZF. In an exemplary OIS procedure, when ZF=1, LMV is determined by the Wide camera $EFL_W$ (i.e. $EFL_{ZF}=EFL_W$ and LMV=CT*$EFL_W$). Further exemplarily, when ZF>e (i.e. ZF>$EFL_T/EFL_W$), LMV is determined by $EFL_T$ (i.e. $EFL_{ZF}=EFL_T$ and LMV=CT*$EFL_T$). Further exemplarily yet, for a ZF between 1 and e, the $EFL_{ZF}$ may shift gradually from $EFL_W$ to $EFL_T$ according to $EFL_{ZF}$=ZF*$EFL_W$. As mentioned, the OIS procedure above is exemplary, and other OIS procedures may use other relationships between $EFL_{ZF}$ and ZF to provide other type of LMV.

While this disclosure has been described in terms of certain embodiments and generally associated methods, alterations and permutations of the embodiments and methods will be apparent to those skilled in the art. The disclosure is to be understood as not limited by the specific embodiments described herein, but only by the scope of the appended claims.

What is claimed is:

1. A camera system, comprising:

a Wide camera that includes a Wide lens having an optical axis, an effective focal length $EFL_W$ and a total track length $TTL_W$, wherein a ratio $TTL_W/EFL_W$ is larger than 1.1; and a Tele camera that includes a Tele lens with a F number smaller than 3.2 wherein the Tele lens includes a plurality of lens elements with a first lens element with a positive refractive power facing an object side, and with a window positioned between the plurality of refractive lens elements and an image plane, wherein a height H of the camera system measured along an axis parallel to the optical axis is in the range of 4 mm to 12 mm, and wherein a height difference between the Tele and Wide cameras measured along the axis parallel to the optical axis is equal to or smaller than 1.65 mm.

2. The camera system of claim 1, wherein the Tele lens has a stop positioned at an object side of a second lens element.

3. The camera system of claim 1, wherein a center thickness of each lens element of the plurality of lens elements is equal to or larger than 0.2 mm.

4. The camera system of claim 1, wherein the Tele lens has an effective focal length $EFL_T$, and wherein a ratio $EFL_T/EFL_W$ is in a range 1.3-2.0.

5. The camera system of claim 1, wherein H≤7 mm.

6. The camera system of claim 1, wherein the Tele lens has an effective focal length $EFL_T$ and a total track length $TTL_T$ and wherein $TTL_T/EFL_T<1.0$.

7. The camera system of claim 6, wherein $TTL_T/EFL_T<0.9$.

8. The camera system of claim 1, wherein the Tele lens includes, in order from the object side to the image plane a first lens group and a second lens group, and wherein an air gap between the first lens group and the second lens group is larger than any other air gap between lens elements.

9. The camera system of claim 8, wherein the air gap between the first lens group and the second lens group is larger than 2 times any other air gap between lens elements.

10. The camera system of claim 8, wherein the first lens group includes three lens elements and wherein the second lens group includes two lens elements.

11. The camera system of claim 1, wherein both the Tele camera and the Wide camera are operational to perform optical image stabilization (OIS), wherein the Wide lens is moved for OIS of the Wide camera, and wherein the Tele lens is moved for OIS of the Tele camera.

12. The camera system of claim 11, wherein the movement for OIS of the Wide camera is determined by $EFL_W$, and wherein the movement for OIS of the Tele camera is determined by $EFL_T$.

13. The camera system of claim 1, wherein $EFL_W$ is in a range of 2.5 mm-6 mm.

14. The camera system of claim 1, wherein $EFL_T$ is in a range of 5 mm-12 mm.

15. The camera system of claim 1, wherein the Tele lens comprises a second lens element with negative refractive power.

16. The camera system of claim 15, wherein the Tele lens comprises a third lens element with negative refractive power.

17. The camera system of claim 16, wherein the Tele lens comprises a fourth lens element with positive refractive power.

18. The camera system of claim 17, wherein the Tele lens comprises a fifth lens element with negative refractive power.

19. The camera system of claim 1, wherein the camera system is included in a mobile device.

20. The camera system of claim 19, wherein the mobile device is a smartphone.

* * * * *